(12) United States Patent
No et al.

(10) Patent No.: US 8,810,895 B2
(45) Date of Patent: Aug. 19, 2014

(54) ELECTROPHORETIC DISPLAY DEVICE

(75) Inventors: Jung-Hun No, Yongin-si (KR);
Myung-Eun Kim, Seongnam-si (KR);
WooJae Lee, Yongin-si (KR); Wangsu Hong, Suwon-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 0 days.

(21) Appl. No.: 13/412,830

(22) Filed: Mar. 6, 2012

(65) Prior Publication Data

US 2013/0050804 A1 Feb. 28, 2013

(30) Foreign Application Priority Data

Aug. 24, 2011 (KR) ........................ 10-2011-0084754

(51) Int. Cl.
*G02F 1/167* (2006.01)

(52) U.S. Cl.
CPC ........ *G02F 1/167* (2013.01); *G02F 2001/1676* (2013.01)
USPC ............................ 359/296; 359/290; 345/107

(58) Field of Classification Search
USPC ................... 359/237–324; 345/107
See application file for complete search history.

(56) References Cited

U.S. PATENT DOCUMENTS

| 6,639,580 | B1 | 10/2003 | Kishi et al. | |
| 7,250,933 | B2 | 7/2007 | De Boer et al. | |
| 7,277,219 | B2 * | 10/2007 | Ikeda | 359/296 |
| 2011/0169869 | A1 * | 7/2011 | Wang et al. | 345/690 |

FOREIGN PATENT DOCUMENTS

| JP | 3421494 | 6/2003 | |
| KR | 1020030011098 | 2/2003 | |
| KR | 1020080102574 | 11/2008 | |
| WO | WO 2010015979 A1 * | 2/2010 | G02F 1/167 |

* cited by examiner

*Primary Examiner* — Ricky Mack
*Assistant Examiner* — Gary O'Neill
(74) *Attorney, Agent, or Firm* — F. Chau & Associates, LLC

(57) ABSTRACT

An electrophoretic display device includes an array substrate, an opposing substrate, and an electrophoretic layer disposed between the array substrate and the opposing substrate. The array substrate includes a first base substrate having a plurality of pixel regions, and a pixel electrode having a plurality of electrode patterns disposed in each of the pixel regions. The opposing substrate includes a second base substrate positioned opposite to the first base substrate, and a common electrode disposed on a surface of the second base substrate that faces the first base substrate. The electrophoretic layer includes a plurality of polarity particles dispersed in a non-polar solvent. The common electrode includes a plurality of openings disposed in a region corresponding to each of the electrode patterns.

22 Claims, 17 Drawing Sheets

ELECTROPHORETIC DISPLAY DEVICE

CROSS-REFERENCE TO RELATED APPLICATION

This application claims priority under 35 U.S.C. §119 to Korean Patent Application No. 10-2011-0084754 filed on Aug. 24, 2011, the disclosure of which is incorporated by reference herein in its entirety.

TECHNICAL FIELD

Exemplary embodiments of the present invention relate to an electrophoretic display device and, more particularly, an electrophoretic display device capable of improving display quality.

DISCUSSION OF THE RELATED ART

An electrophoretic display device displays images by rearranging colored and charged particles using an electric field. An electrophoretic display is sometimes referred to as electronic paper, or e-paper, and may be used in e-reader devices. An electrophoretic display device may have a structure including two opposing substrates, an insulating material filling a space between the two substrates, and charged particles dispersed in the insulating material. Electrodes are formed on the two substrates, respectively. If a power source is applied to each of the electrodes to form an electric field, the charged particles are moved by the electric field. As a result, the electrophoretic display device may display a grayscale image.

If the electric field between the two substrates in the electrophoretic display device is not formed uniformly, the ability to control the movement of the charged particles may decrease, and the resulting non-uniform movement of the particles may result in a reduced quality of the displayed grayscale image.

SUMMARY

Exemplary embodiments of the present invention provide an electrophoretic display device capable of improving image quality.

According to an exemplary embodiment, an electrophoretic display device includes an array substrate, an opposing substrate, and an electrophoretic layer disposed between the array substrate and the opposing substrate. The array substrate includes a first base substrate including a plurality of pixel regions, and a pixel electrode including a plurality of electrode patterns disposed in each of the pixel regions. The opposing substrate includes a second base substrate positioned opposite to the first base substrate, and a common electrode disposed on a surface of the second base substrate facing the first base substrate. The electrophoretic layer includes a plurality of polarity particles dispersed in a nonpolar solvent. The common electrode includes a plurality of openings disposed in a region corresponding to each of the electrode patterns.

In an exemplary embodiment, an area of each of the openings may be about equal to or greater than an area of the corresponding electrode pattern when viewed from a plan view. A distance between each of the electrode patterns and the common electrode may be about equal to or less than about 5 µm when viewed from a plan view.

In an exemplary embodiment, the opposing substrate may further include a protrusion disposed between the second base substrate and the common electrode, and the protrusion may separate each of the pixel regions into a plurality of electric field regions. A space formed by the protrusion may be one of a circle, a quadrangle, a hexagon, and an octagon. The protrusion may include a plurality of protruding patterns of island shapes disposed between the adjacent electrode patterns when viewed from a plan view.

In an exemplary embodiment, each of the electrode patterns is conductive, and at least a surface of each of the electrode patterns may absorb light.

In an exemplary embodiment, the array substrate may further include a reflection layer disposed between the first base substrate and the pixel electrode.

According to an exemplary embodiment, an electrophoretic display device includes a plurality of electrode patterns disposed on a first base substrate, a plurality of protrusions disposed on a second base substrate, wherein the second base substrate is positioned opposite to the first base substrate, a common electrode disposed on the plurality of protrusions and the second substrate, wherein the common electrode comprises a plurality of openings formed between adjacent protrusions in a region corresponding to the plurality of electrode patterns, and the common electrode faces the plurality of electrode patterns, and an electrophoretic layer disposed between the first and second base substrates, and comprising a plurality of polarity particles dispersed in a non-polar solvent, wherein an area of each of the openings is about equal to or greater than an area of a corresponding electrode pattern.

BRIEF DESCRIPTION OF THE DRAWINGS

The above and other features of the present invention will become more apparent by describing in detail exemplary embodiments thereof with reference to accompanying drawings, in which.

DETAILED DESCRIPTION

Figure 1:
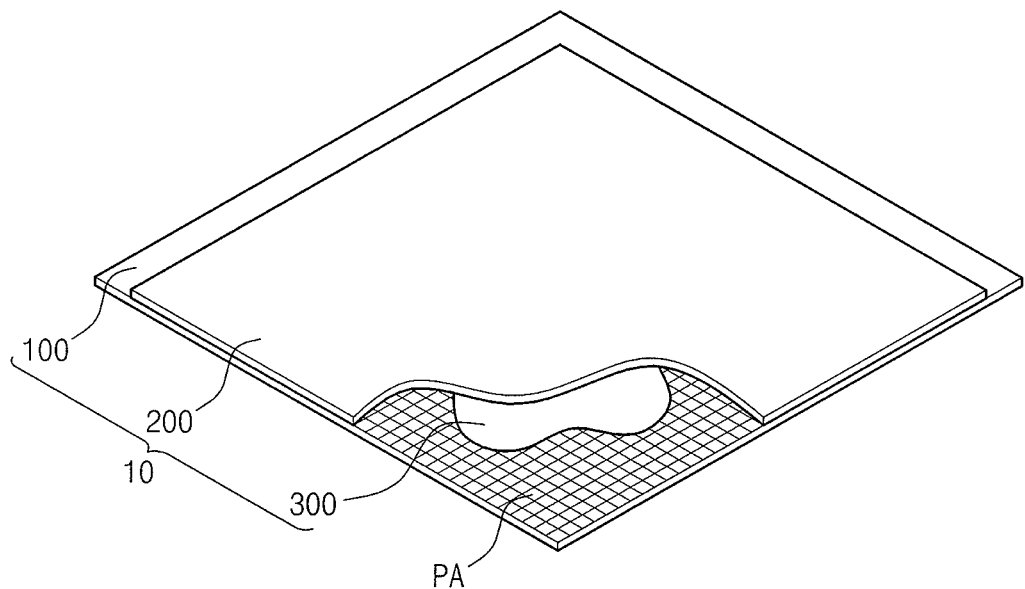
FIG. 1 is a perspective view illustrating an electrophoretic display device according to an exemplary embodiment of the present invention.

Exemplary embodiments of the present invention will be described more fully hereinafter with reference to the accompanying drawings. Like reference numerals may refer to like elements throughout the accompanying drawings.

Figure 2:
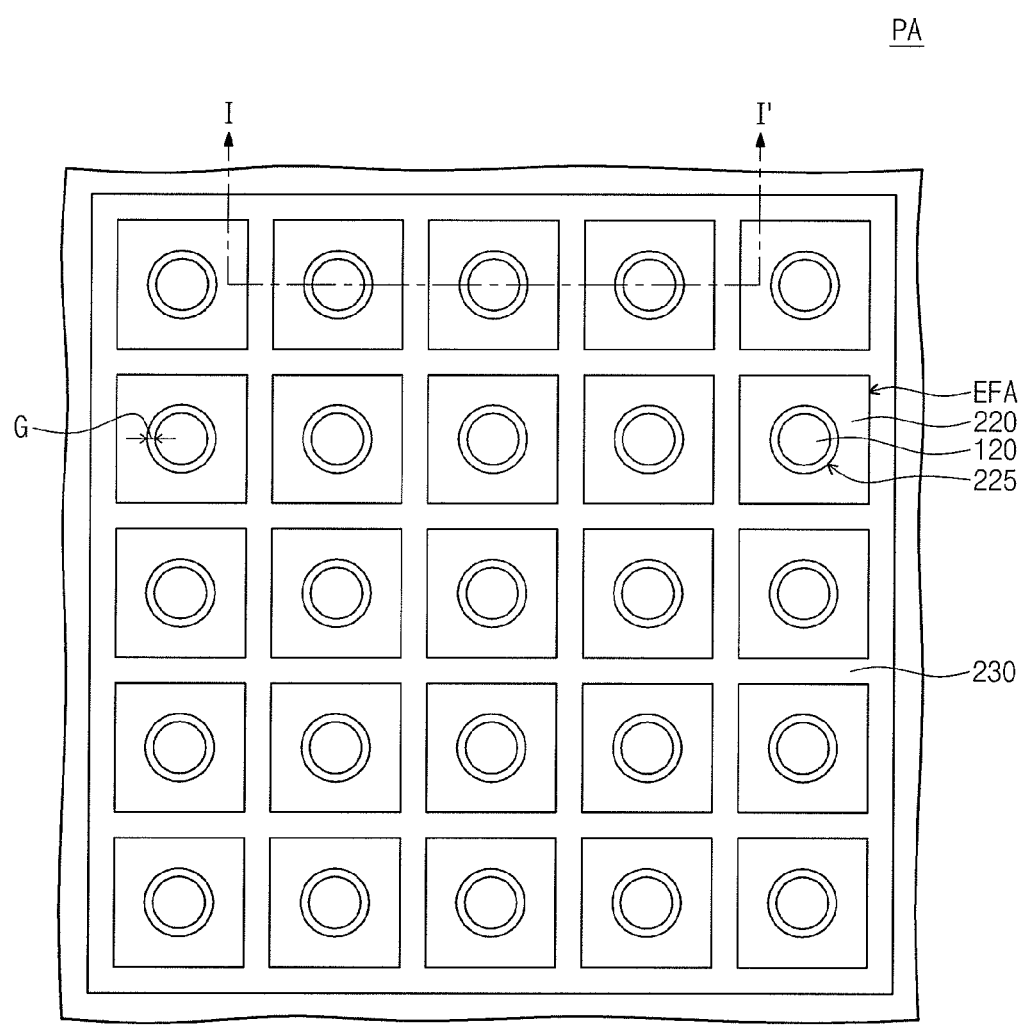
FIG. 2 is a plan view illustrating one pixel of the electrophoretic display device of FIG. 1.
Figure 3A:
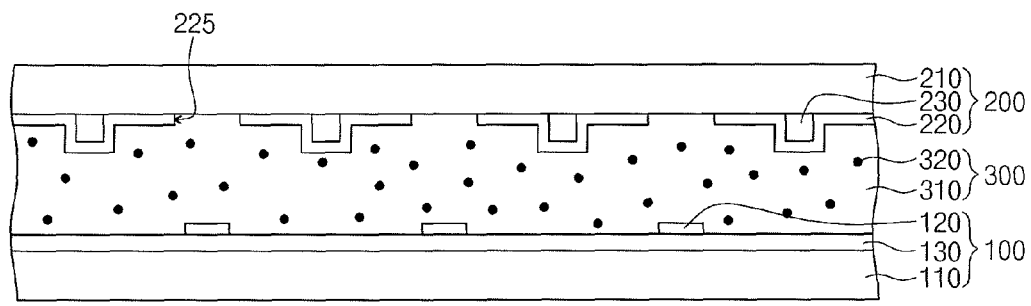
FIGS. 3A and 3B are cross-sectional views taken along line I-I' of FIG. 2.
Figure 3B:
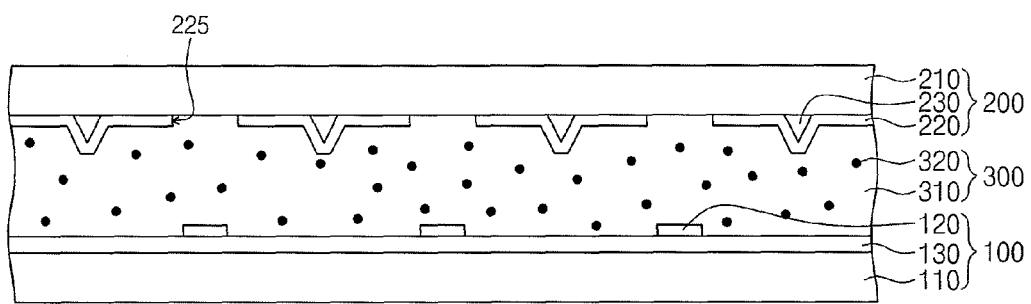

FIG. 1 is a perspective view illustrating an electrophoretic display device according to an exemplary embodiment of the present invention. FIG. 2 is a plan view illustrating one pixel of the electrophoretic display device of FIG. 1. FIGS. 3A and 3B are cross-sectional views taken along line I-I' of FIG. 2.

Referring to FIGS. 1, 2, 3A, and 3B, an electrophoretic display device 10 may include an array substrate 100, an opposing substrate 200 opposite the array substrate 100, and an electrophoretic layer 300 disposed between the array substrate 100 and the opposing substrate 200. The electrophoretic layer 300 may include a non-polar solvent 310 and a plurality of polarity particles 320 dispersed in the non-polar solvent 310.

The array substrate 100 may include a first base substrate 110 having a plurality of pixel regions PA, and a pixel electrode having a plurality of electrode patterns 120 disposed in each of the pixel regions PA. Additionally, the array substrate 100 may further include a reflection layer 130 disposed between the first base substrate 110 and the pixel electrode.

The first base substrate 110 may include a display region and a peripheral region on which a peripheral circuit is formed. The display region may include a plurality of the pixel regions PA arranged in matrix form. Additionally, each of the pixel regions may include a gate line extending in a first direction and a data line extending in a second direction crossing the first direction. The data line crosses the gate line and is insulated from the gate line. Further, a thin film transistor electrically connected to the gate and data lines may be provided on each of the pixel regions PA. The thin film transistor switches a driving signal provided to the pixel electrode.

The pixel electrode includes the plurality of electrode patterns 120 disposed on each of the pixel regions PA of the first base substrate 110. The electrode patterns 120 may be conductive, and a light incident from the exterior (hereinafter referred to as an "external light") may be absorbed into at least the surfaces of the electrode patterns 120. For example, each of the electrode patterns 120 may include a conductive layer disposed on the first base substrate 110, and a light absorption layer disposed on the conductive layer. The light absorption layer may be any material capable of absorbing light.

The reflection layer 130 reflects the external light which is transmitted through the electrophoretic layer 300 to be incident thereto. The reflection layer 130 may be any organic material such as, for example, a white photoresist capable of reflecting light.

The opposing substrate 200 may include a second base substrate 210 and a common electrode 220 opposite the pixel electrode. Additionally, the opposing substrate 200 may further include a protrusion 230 disposed between the second base substrate 210 and the common electrode 220. A portion of the common electrode 220 may protrude towards the array substrate 100 with the protrusion 230.

The common electrode 220 is disposed on a surface of the second base substrate 210 facing the array substrate 100. A common voltage is applied to the common electrode 220 to form an electric field near the pixel electrode. The common electrode 220 may include a transparent conductive material such as, for example, indium-tin oxide (ITO) or indium zinc oxide (IZO). The external light incident from the second base substrate 210 may be transmitted through the common electrode 220 and provided to the electrophoretic layer 300.

Additionally, the common electrode 220 may include an opening 225 formed in a region corresponding to each of the electrode patterns 120. An area of the openings 225 in the common electrode 220 may be about equal to or greater than an area of each of the electrode patterns 120 corresponding to each of the openings 225, as shown in FIGS. 3A and 3B. As a result, in an exemplary embodiment, the common electrode 220 is not overlapped with the pixel electrode. Thus, the electric field formed between the pixel electrode and the common electrode 220 is not focused on a specific region between the pixel electrode and the common electrode 220 when the power source is applied.

A distance G between each of the electrode patterns 120 and the common electrode 220 created as a result of the formation of the opening 225 may be about equal to or less than about 5 μm when viewed from a top view, as shown in FIG. 2. Distance G is created to be about equal to or less than about 5 μm since the electric field controlling the movement of the polarity particles 320 may become weaker if the distance G between the pixel electrode and the common electrode 220 is greater than about 5 μm. Thus, a moving speed of the polarity particles 320 may be reduced, which results in a reduced response speed of the electrophoretic display device 10.

The protrusion 230 is disposed between the second base substrate 210 and the common electrode 220. As a result, a portion of the common electrode 220 protrudes towards the array substrate 100.

As shown in FIG. 2, the protrusion 230 may divide each of the pixel regions PA into a plurality of electric field regions EFA. Each of the electric field regions EFA may have a quadrangle shape when viewed from a plan view, as shown in FIG. 2. For example, the protrusion 230 may have a grid shape dividing each of the pixel regions PA into the plurality of electric field regions EFA, as shown in FIG. 2. Each of the electric field regions EFA divided by the protrusion 230 corresponds to each of the electrode patterns 120, respectively.

Additionally, a cross-section of the protrusion 230 may have various shapes. For example, as shown in FIG. 3A, the cross-section of the protrusion 230 may have a quadrangle shape in an exemplary embodiment. As shown in FIG. 3B, the cross-section of the protrusion 230 may have a triangle shape in an exemplary embodiment.

As shown in FIGS. 3A and 3B, a portion of the common electrode 220 protrudes towards the pixel electrode via the protrusion 230. If the height of the protrusion is greater than about 2 μm, the electric field may be non-uniform due to the common electrode 220 being too close to the pixel electrode. Thus, in an exemplary embodiment, the protrusion has a height of about 2 μm or less.

The protrusion 230 may be, for example, a transparent organic material, a transparent inorganic material, or a combination thereof. As a result, in an exemplary embodiment, the external light incident from the second base substrate 210 is not reflected or absorbed by the protrusion 230, and is provided to the electrophoretic layer 300. As a result, a reduction of light transmittance caused by the protrusion 230 may be reduced.

Furthermore, in an exemplary embodiment, the opposing substrate 200 may further include an insulating layer disposed between the second base substrate 210 and the common electrode 220.

The electrophoretic layer 300 includes the non-polar solvent 310 and the plurality of polarity particles 320 dispersed in the non-polar solvent 310.

The non-polar solvent 310 is used as a dispersion fluid. An additional agent such as, for example, a surfactant may be added in the non-polar solvent 310. The non-polar solvent 310 may reduce the likelihood of the polarity particles 320 being settled by gravity. Thus, the polarity particles 320 may not be heeled or agglomerated in the pixel region PA.

The polarity particles 320 may include particles having a single color, or at least two kinds of color particles having different colors from each other. For example, in an exemplary embodiment, the polarity particles 320 may be color particles having the same polarity as each other and have the same color, such as, for example, carbon black particles showing a black color. In an exemplary embodiment, the polarity particles 320 may include at least two kinds of color particles having the same polarity as each other and showing different colors from each other. In an exemplary embodiment, the polarity particles 320 may include at least two kinds of color particles having different polarities from each other and showing different colors from each other.

Hereinafter, operation of the electrophoretic display device according to exemplary embodiments of the present invention will be described with reference to FIGS. 3A-3B, 4A-4B, and 5A-5B. FIGS. 4A-4B and 5A-5B are cross-sectional views illustrating the operation of the electrophoretic display device according to exemplary embodiments of the present invention. For example, the operation of the electrophoretic display device will be described referring to a case where the polarity particles 320 are black particles charged with positive static charges.

The power source is not applied to the electrophoretic display device 10 in an initial state. In this case, the polarity particles 320 are randomly dispersed in the non-polar solvent 310, as shown in FIGS. 3A and 3B.

A positive potential is applied to the pixel electrode and a negative potential is applied to the common electrode 220 to form an electric field in the electrophoretic layer 300. When the electric field is formed, the polarity particles 320 begin moving.

Figure 4A:
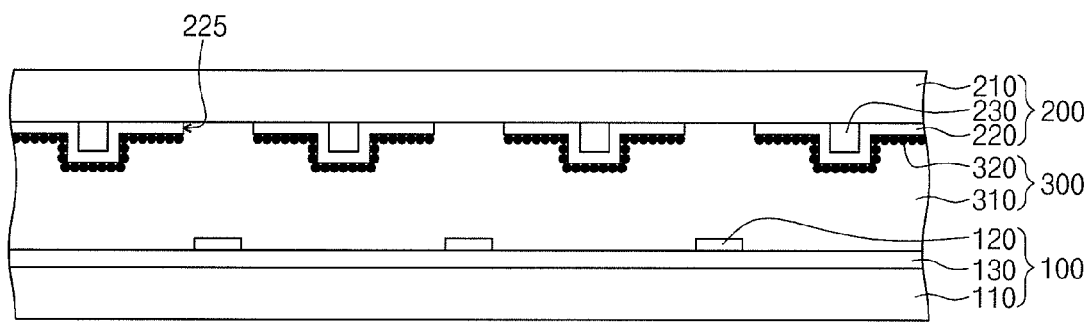
FIGS. 4A-4B and 5A-5B are cross-sectional views illustrating the operation of the electrophoretic display device according to exemplary embodiments of the present invention.
Figure 4B:
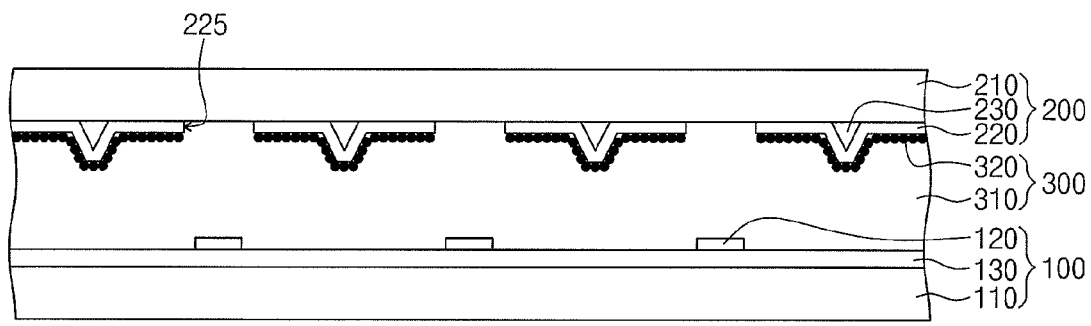

For example, as shown in FIGS. 4A-4B, the polarity particles 320 move towards the common electrode 220 as a result of the electric field formed between the pixel electrode and the common electrode 220. The polarity particles 320 that have moved to the common electrode 220 may block out the external light so that the external light is not incident into the electrophoretic layer 300. Additionally, the light incident into the electrophoretic layer 300 through the opening 225 of the common electrode 220 may be absorbed by each of the electrode patterns 120. Accordingly, the electrophoretic display device 10 can display a black color.

If a negative potential is applied to the pixel electrode and a positive potential is applied to the common electrode 220 to form an electric field in the electrophoretic layer 300, the polarity particles 320 begin moving towards the pixel electrode.

Figure 5A:
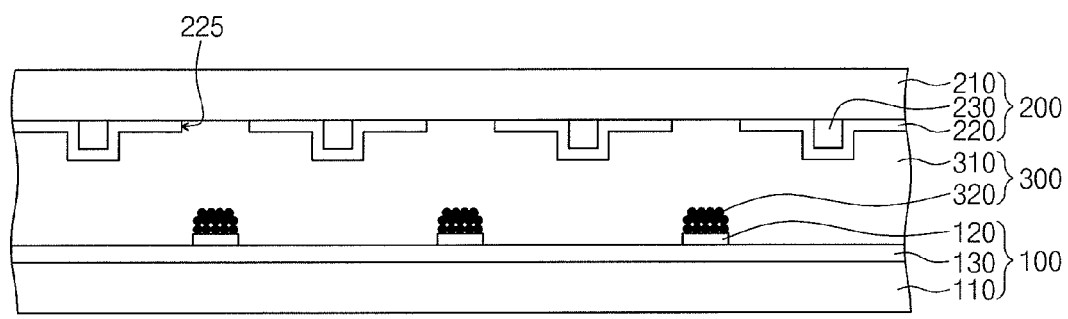
Figure 5B:
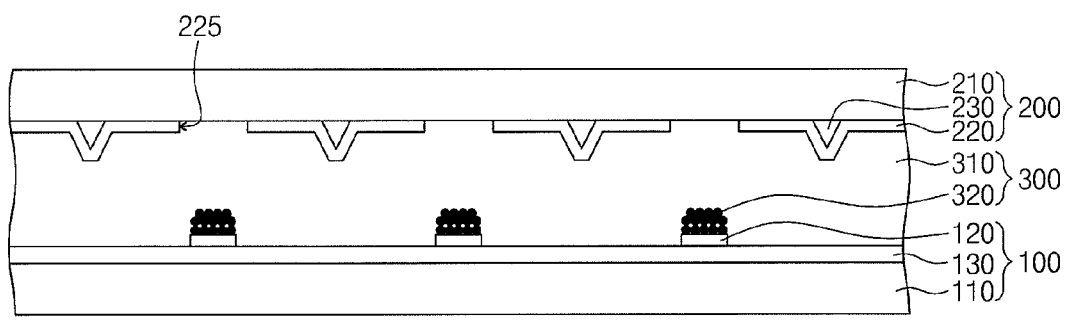

The polarity particles 320 that have moved to each of the electrode patterns 120 are agglomerated on a surface of each of the electrode patterns 120, as shown in FIGS. 5A and 5B.

Accordingly, the external light is transmitted through the common electrode 220 to be incident into the electrophoretic layer 300, and the external light incident into the electrophoretic layer 300 is reflected by the reflection layer 130. Since the reflection layer 130 reflects visible light, the electrophoretic display device can display a white color.

Hereinafter, exemplary embodiments of the present invention will be described with reference to FIGS. 6 through 9. In FIGS. 6 through 9, the same elements as shown in FIGS. 1 through 5 will be indicated by the same reference numerals or the same reference designators.

FIGS. 6 through 9 are plan views illustrating the arrangement of a pixel electrode, a common electrode, and a protrusion used in an electrophoretic display device, according to exemplary embodiments of the present invention.

Figure 6:
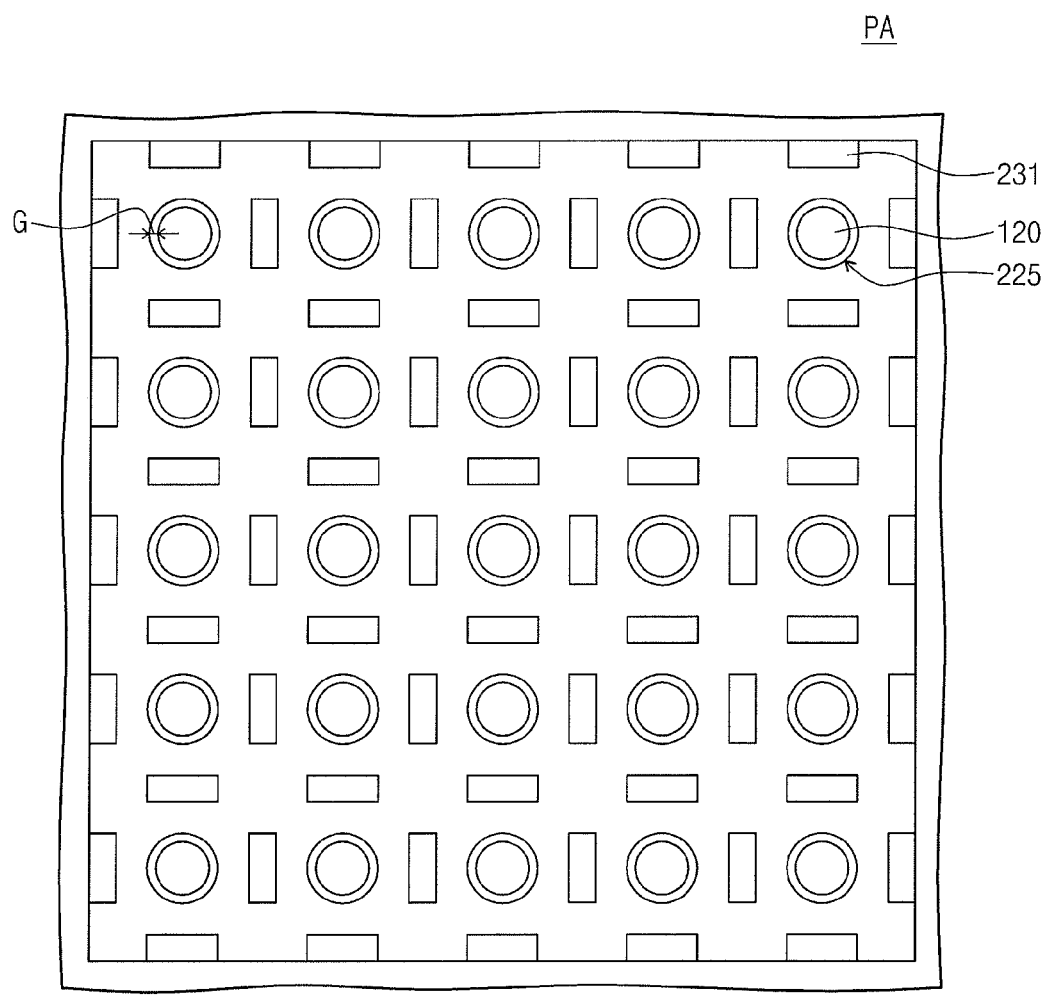
FIGS. 6 through 9 are plan views illustrating the arrangement of a pixel electrode, a common electrode, and a protrusion used in an electrophoretic display device according to exemplary embodiments of the present invention.

As shown in FIG. 6, a protrusion 230 of the opposing substrate 200 may include a plurality of protruding patterns 231 of island shapes disposed between adjacent electrode patterns 120 when viewed from a plan view.

Figure 7:
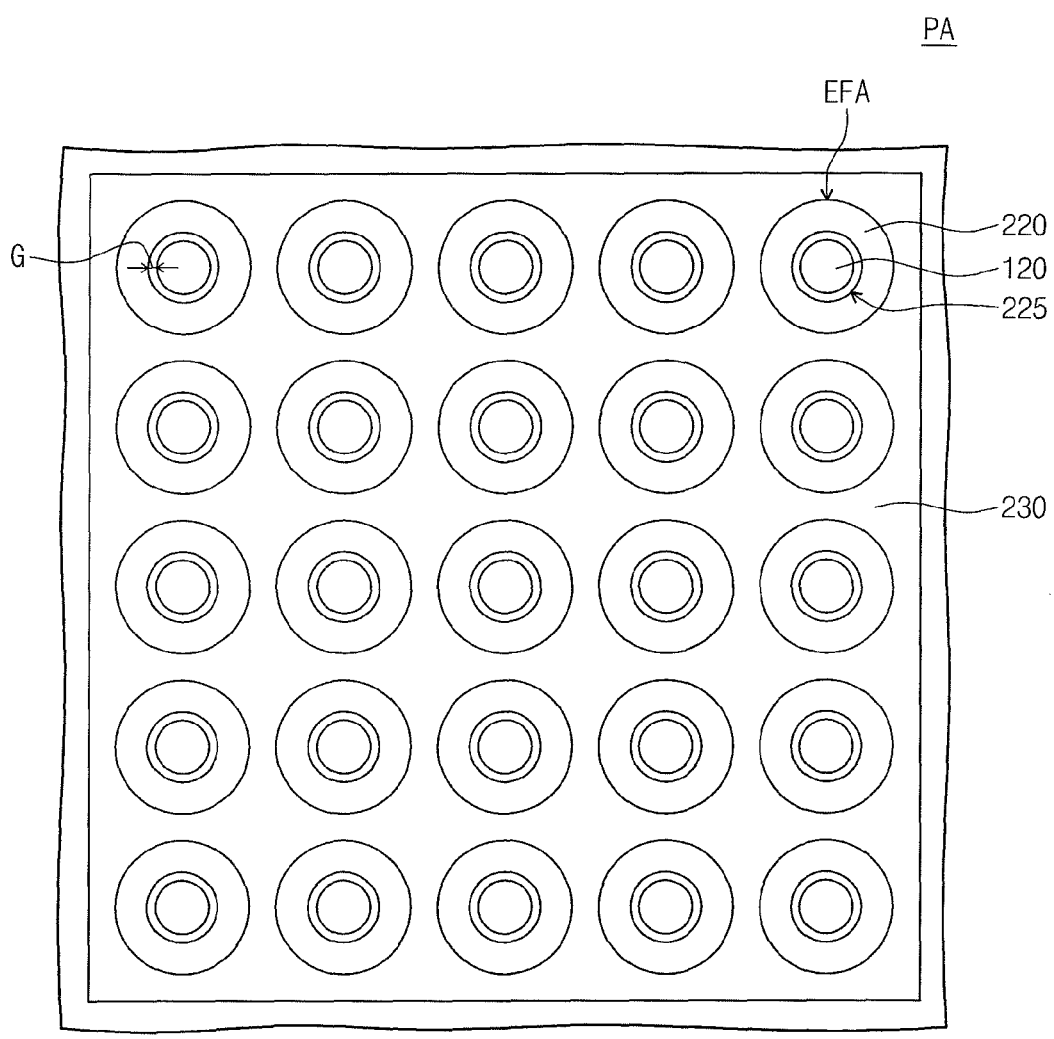
Figure 8:
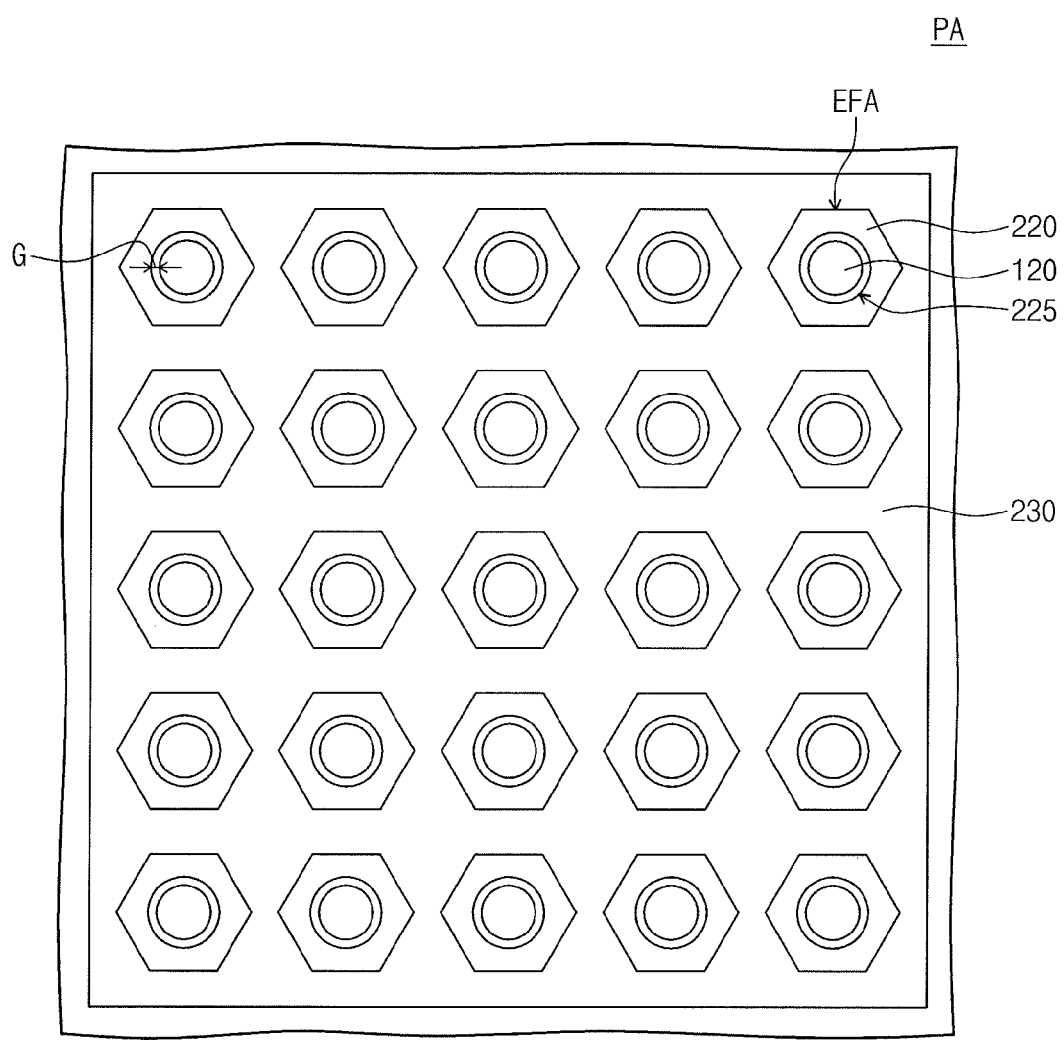
Figure 9:
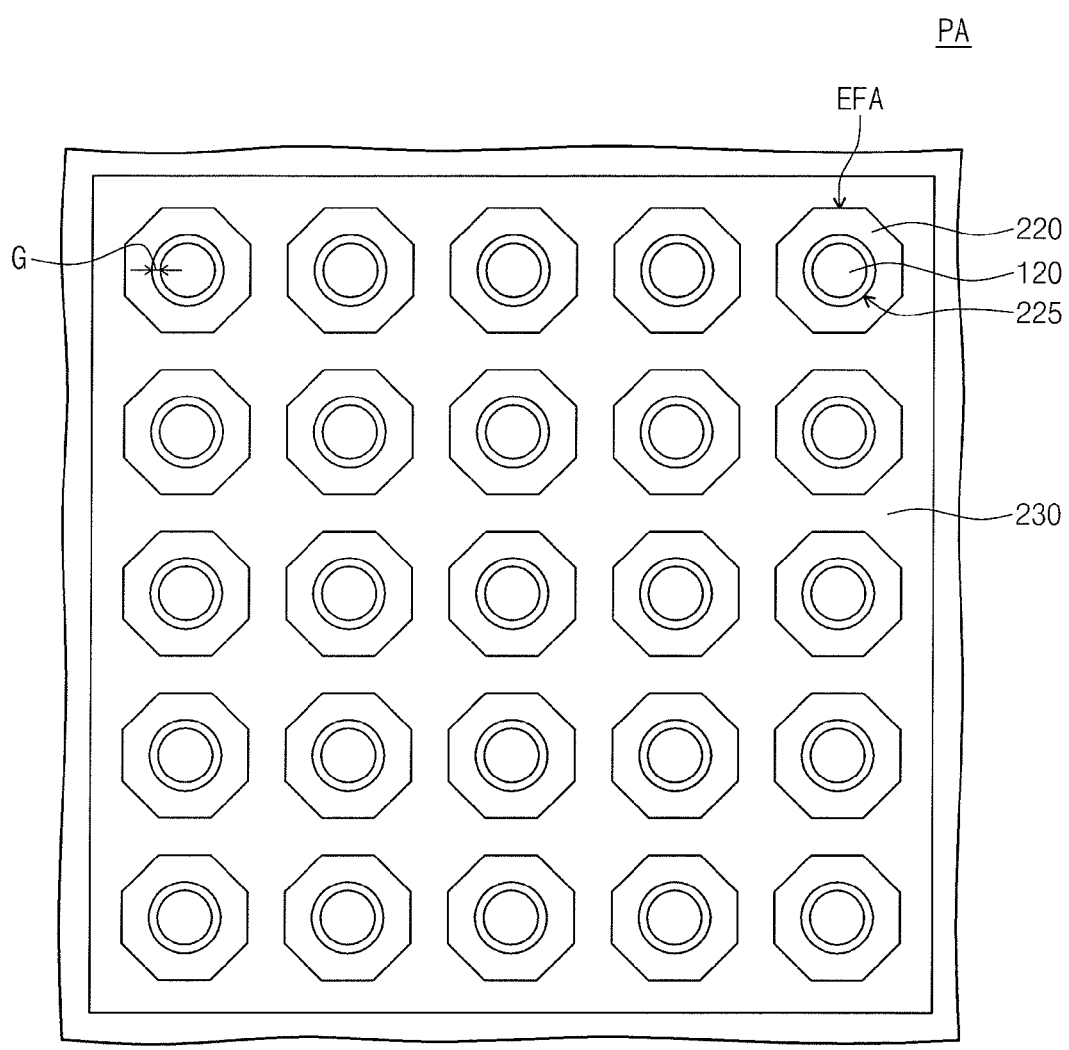

As shown in FIGS. 7 through 9, the protrusion 230 may have a certain shape surrounding each of the electrode patterns 120. For example, a space partitioned by the protrusion 230 may result in the electric field region EFA having one of a circle shape, a hexagon shape, or an octagon shape in a plan view, as shown in FIGS. 7 through 9, respectively. Accordingly, a distance between the protruding portion of the common electrode 220 and the electrode patterns 120 can be substantially uniform. As a result, the electric field between the protruding portion of the common electrode 220 and the electrode patterns 120 can be substantially uniform.

Figure 10:
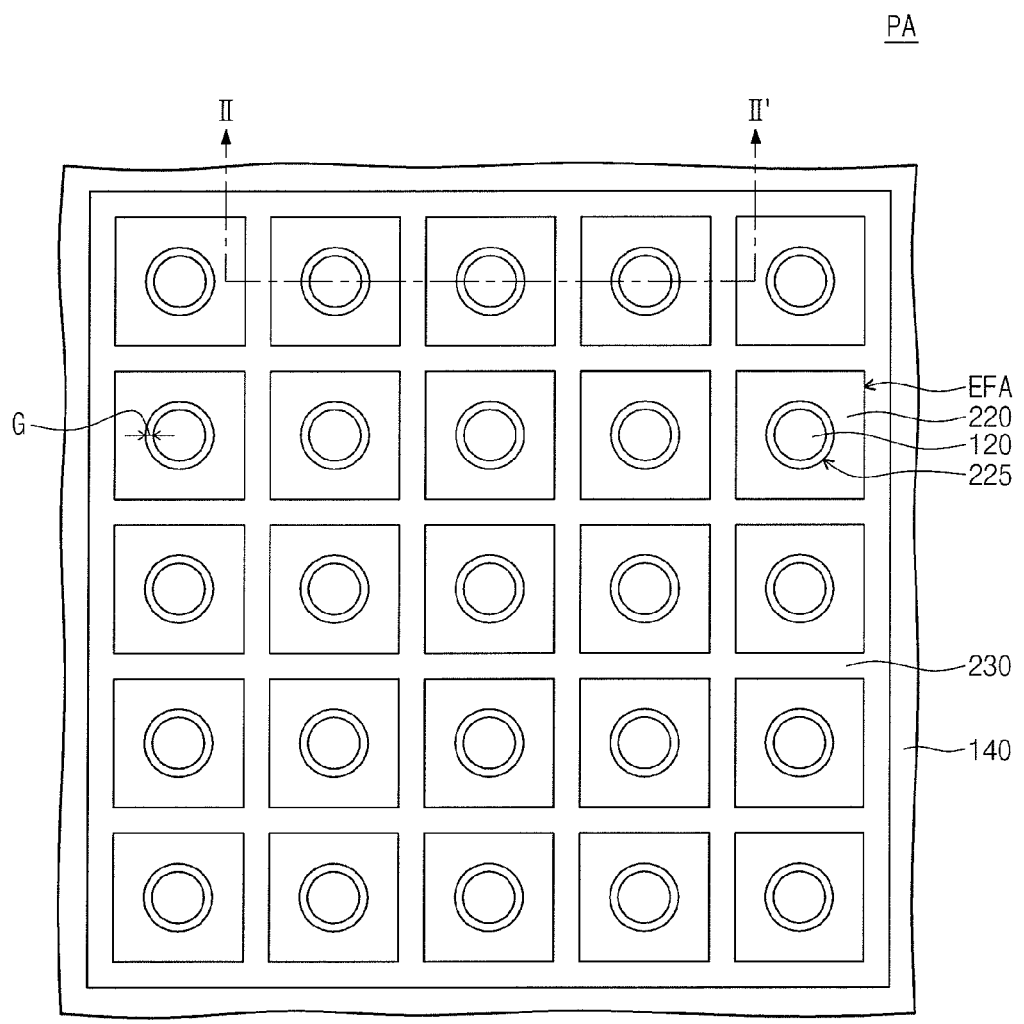
FIG. 10 is a plan view illustrating an electrophoretic display device according to an exemplary embodiment of the present invention.
Figure 11:
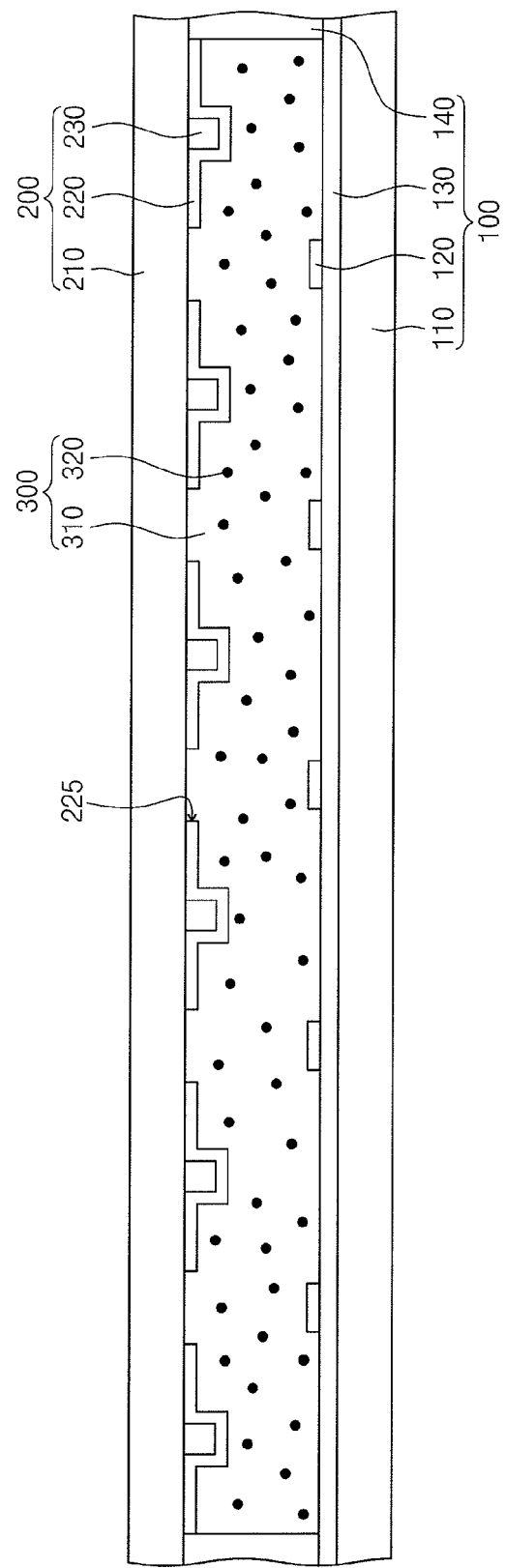
FIG. 11 is a cross-sectional view taken along line II-II' of FIG. 10.

Hereinafter, exemplary embodiments of the present invention will be described with reference to FIGS. 10 and 11. In FIGS. 10 and 11, the same elements as shown in FIGS. 1 through 5 will be indicated by the same reference numerals or the same reference designators.

FIG. 10 is a plan view illustrating an electrophoretic display device according to an exemplary embodiment of the present invention. FIG. 11 is a cross-sectional view taken along line II-II' of FIG. 10.

Referring to FIGS. 10 and 11, the array substrate 100 of the electrophoretic display device 10 includes a plurality of pixel regions PA, and further includes a partition wall 140 disposed between the pixel regions PA.

The partition wall 140 separates the electrophoretic layer 300 into a plurality of portions corresponding to the plurality of pixel regions PA, respectively. Thus, the partition wall 140 may reduce the likelihood of the polarity particles 320 in the portion of the electrophoretic layer 300 provided to each of the pixel regions PA from moving into neighboring pixel regions PA. As a result, the partition wall 140 may reduce the likelihood of the polarity particles 320 from crowding in one pixel region PA.

Additionally, the partition wall 140 may include a material capable of blocking light. For example, the partition wall 140 may include a metal material such as, for example, chrome (CR), or an organic material such as, for example, a black matrix (BM).

Figure 12:
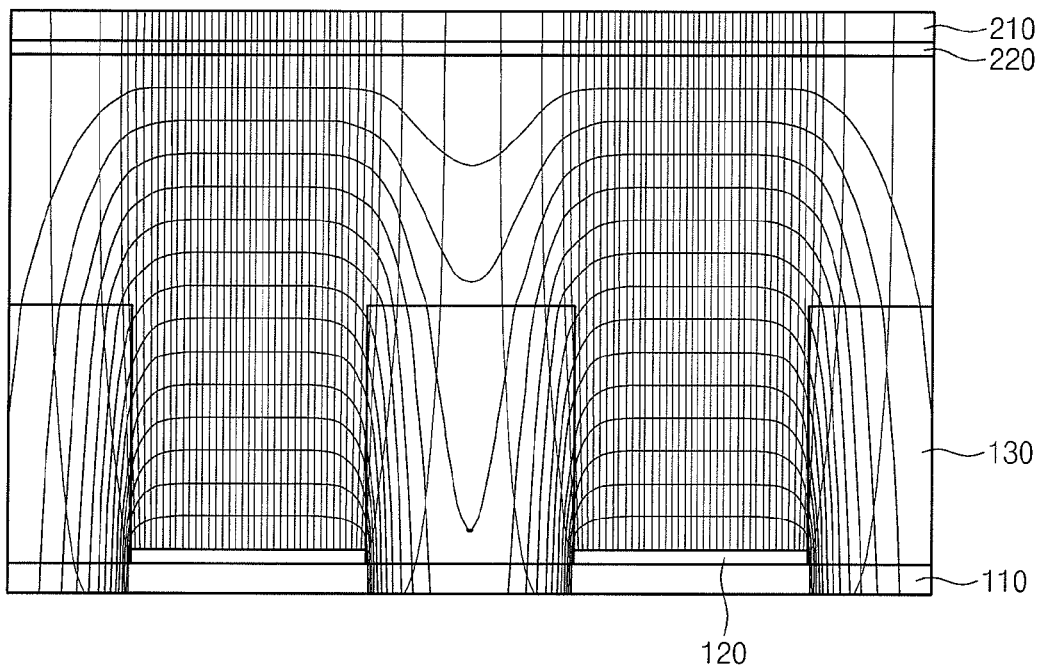
FIG. 12 illustrates an electric field in an electrophoretic display device.
Figure 13:
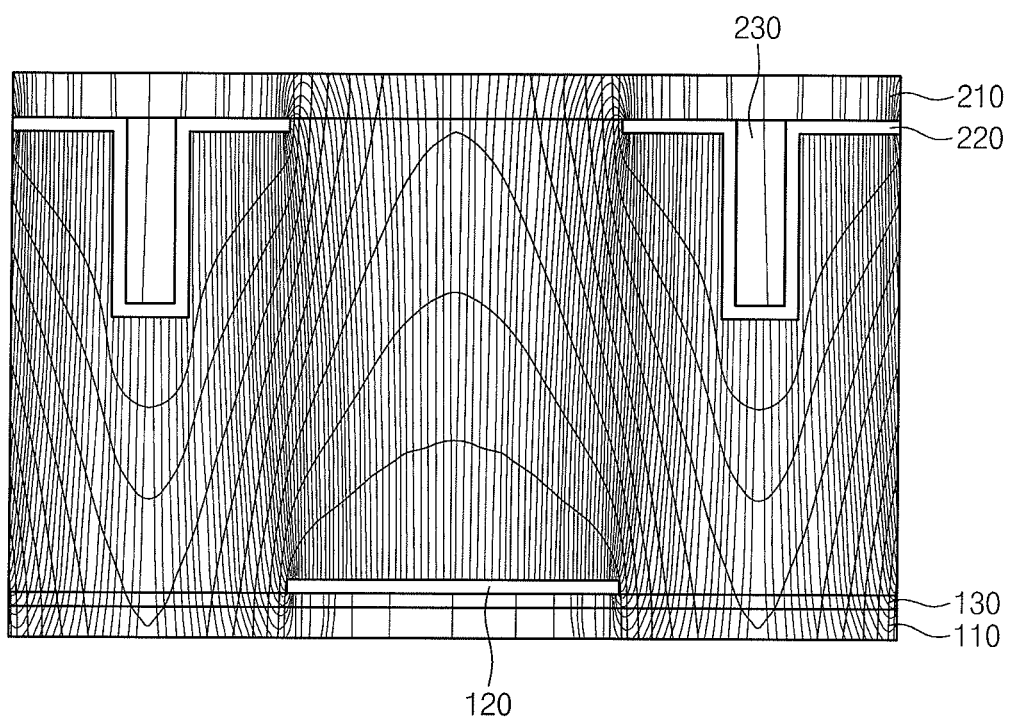
FIGS. 13 and 14 illustrate a change in an electric field based on the height of a protrusion in an electrophoretic display device.
Figure 14:
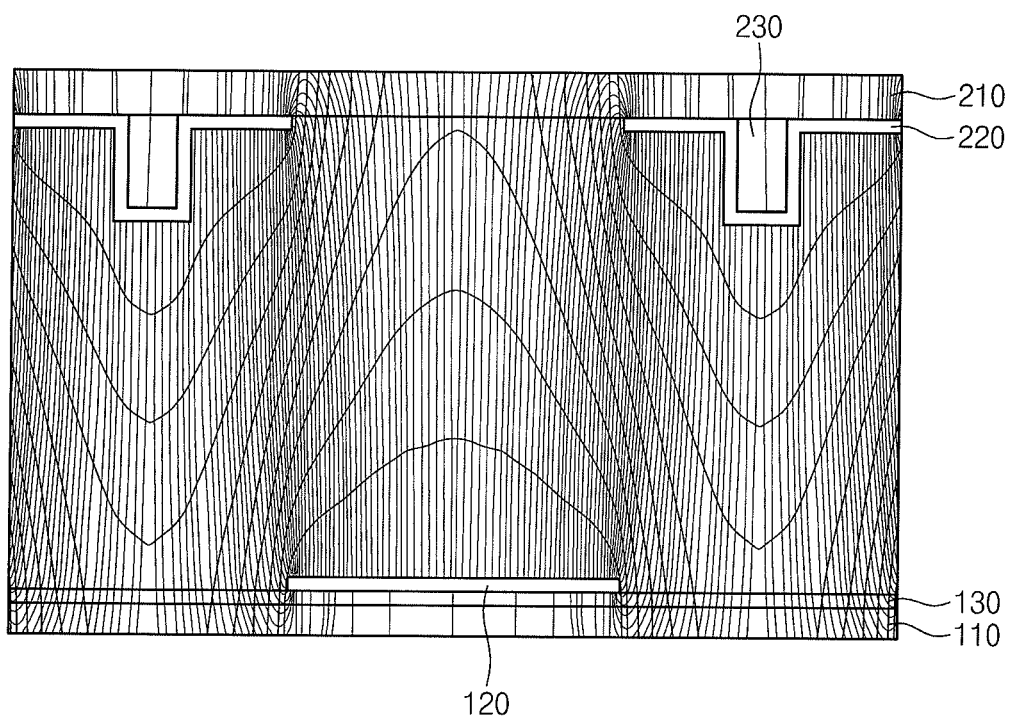

FIG. 12 illustrates an electric field in an electrophoretic display device. FIGS. 13 and 14 illustrate a change in an electric field based on the height of a protrusion in an electrophoretic display device.

Referring to FIG. 12, in an electrophoretic display device, electric flux focuses on a region in which the common electrode 220 and the electrode pattern 120 face each other. For example, a strong electric field is formed in a region in which the common electrode 220 and the electrode pattern 120 face each other, and a weak electric field is formed in a region in which the common electrode 220 and the electrode pattern 120 do not face each other.

Referring to FIGS. 13 and 14, the common electrode 220 includes the opening 225 formed in a region of the common electrode 220 corresponding to the electrode pattern 120, and the common electrode 220 is not overlapped with the electrode pattern 120 in a plan view. Accordingly, an electric flux of the electric field formed by the common electrode 220 and the electrode pattern 120 does not focus on a specific region.

Additionally, a portion of the common electrode 220 protrudes towards the array substrate 100 as a result of the protrusion 230 disposed between the second base substrate 210 and the common electrode 220. The protruding portion of the common electrode 220 may result in a more uniform distribution of the electric flux in the electric field formed by the common electrode 220 and the electrode pattern 120.

Distribution of the electric flux may be more uniform when the height of the protrusion 230 is about 1 µm, and may become less uniform when the height of protrusion 230 is about 2 µm. This is the result of the protruding portion of the common electrode 220 becoming closer to the electrode pattern 120 as the height of the protrusion 230 becomes greater, which results in a strong electric field.

Figure 15:
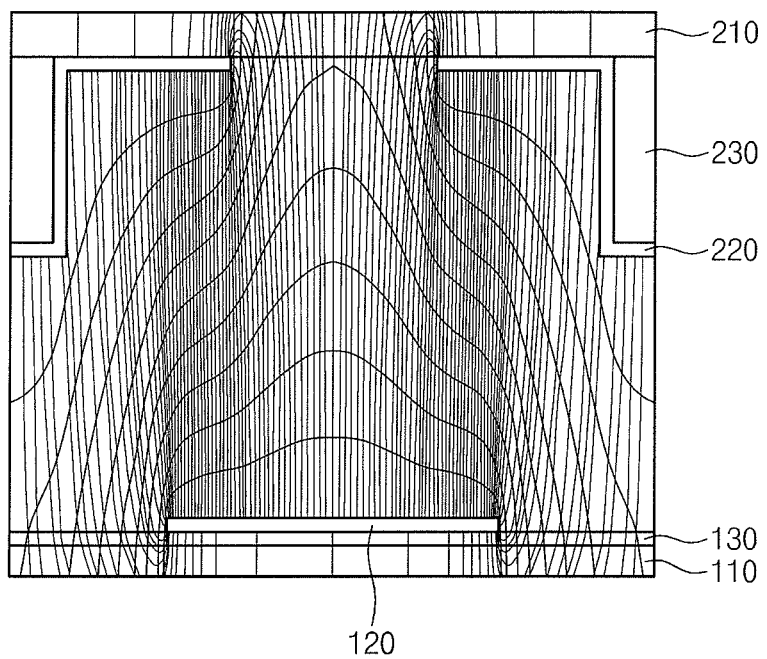
FIGS. 15 through 17 illustrate a change in an electric field when there is an overlap of an electrode pattern and a common electrode in an electrophoretic display device.
Figure 16:
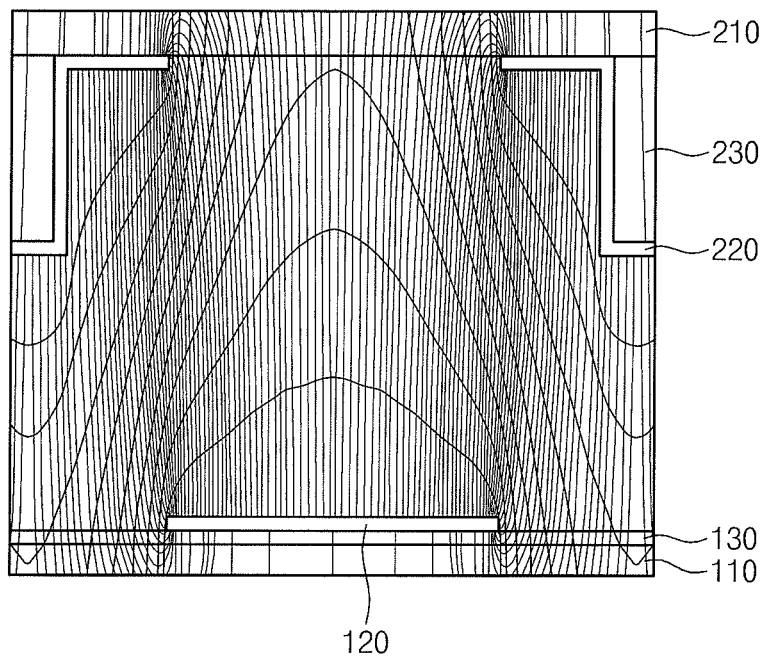
Figure 17:
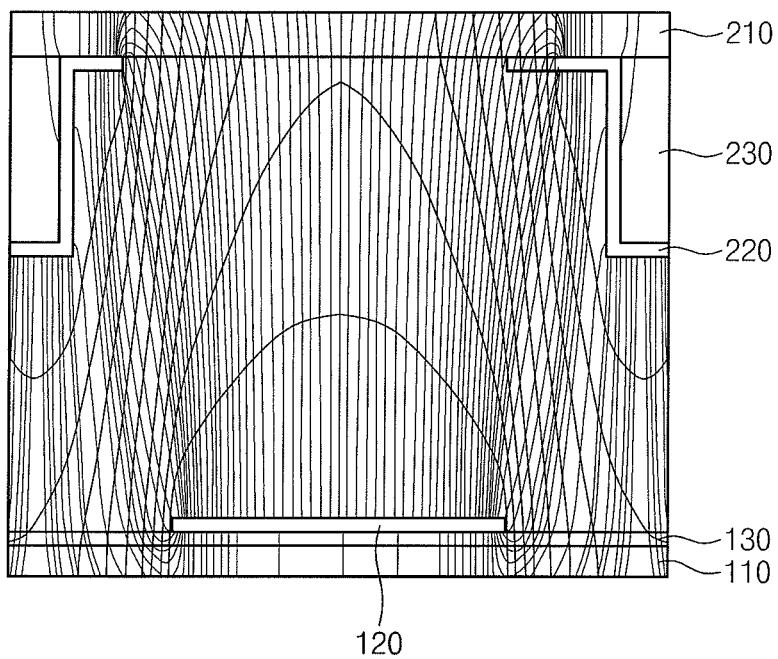

FIGS. 15 through 17 illustrate a change in an electric field when there is an overlap of an electrode pattern and a common electrode in an electrophoretic display device.

Referring to FIG. 15, if the common electrode 220 is partially overlapped with the electrode pattern 120 in a plan view, electric flux focuses on a region in which the common electrode 220 is overlapped with the electrode pattern 120, resulting in the formation of a strong electric field.

Referring to FIGS. 16 and 17, if the common electrode 220 is not overlapped with the electrode pattern 120, the focus of the electric flux in a specific region may decrease. As a result, a substantially uniform electric field can be generated between the common electrode 220 and the electrode pattern 120.

Further, distribution of the electric flux may be more uniform when a distance between the common electrode 220 and the electrode pattern 120 is about 5 µm compared to when a distance between the common electrode 220 and the electrode pattern 120 is about 0 µm. That is, the electric field may become more uniform as the distance between the common electrode 220 and the electrode pattern 120 becomes greater. However, if the distance between the common electrode 220 and the electrode pattern 120 is greater than about 5 µm, a sufficient electric field may not be generated between the common electrode 220 and the electrode pattern 120.

The electrophoretic display device according to exemplary embodiments of the present invention enables an electric field to be uniformly formed between the array substrate and the opposing substrate. Accordingly, the electrophoretic display device can improve display quality.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. An electrophoretic display device, comprising:
an array substrate comprising a first base substrate and a pixel electrode, wherein the first base substrate comprises a plurality of pixel regions, and the pixel electrode comprises a plurality of electrode patterns disposed in each of the pixel regions;
an opposing substrate comprising a second base substrate and a common electrode, wherein the second base substrate is positioned opposite to the first base substrate, and the common electrode is disposed on a surface of the second base substrate that faces the first base substrate; and
an electrophoretic layer disposed between the array substrate and the opposing substrate, and comprising a plurality of polarity particles dispersed in a non-polar solvent,
wherein the common electrode comprises a plurality of openings disposed in a region corresponding to each of the electrode patterns, and each one of the plurality of openings is overlapped with a corresponding one of the plurality of electrode patterns,
wherein an area of each of the openings is about equal to or greater than an area of a corresponding electrode pattern.

2. The electrophoretic display device of claim 1, wherein a distance between each of the electrode patterns and the common electrode is about equal to or less than about 5 µm in a plan view.

3. The electrophoretic display device of claim 1, wherein the opposing substrate further comprises a protrusion disposed between the second base substrate and the common electrode.

4. The electrophoretic display device of claim 3, wherein the protrusion separates each of the pixel regions into a plurality of electric field regions.

5. The electrophoretic display device of claim 4, wherein each of the electric field regions corresponds to each of the electrode patterns.

6. The electrophoretic display device of claim 3, wherein the protrusion comprises a plurality of protruding patterns disposed between adjacent electrode patterns.

7. The electrophoretic display device of claim 3, wherein a shape of a space formed by the protrusion is one of a circle, a quadrangle, a hexagon, and an octagon.

8. The electrophoretic display device of claim 3, wherein a height of the protrusion is about equal to or less than about 2 µm.

9. The electrophoretic display device of claim 3, wherein the protrusion is at least one of a transparent organic material or a transparent inorganic material.

10. The electrophoretic display device of claim 1, wherein each of the electrode patterns is conductive, and at least a portion of each of the electrode patterns absorbs light.

11. The electrophoretic display device of claim 10, wherein each of the electrode patterns comprises:
a conductive layer disposed on the first base substrate; and
a light absorption layer disposed on the conductive layer and comprising a light-absorbing material.

12. The electrophoretic display device of claim 1, wherein the array substrate further comprises a reflection layer disposed between the first base substrate and the pixel electrode.

13. The electrophoretic display device of claim 12, wherein the reflection layer comprises a white photoresist.

14. The electrophoretic display device of claim 1, wherein the polarity particles comprise particles having the same polarity and a single color.

15. The electrophoretic display device of claim 1, wherein the polarity particles comprise at least two kinds of particles having the same polarity and different colors from each other.

16. The electrophoretic display device of claim 1, wherein the polarity particles comprise at least two kinds of particles having different polarities and different colors from each other.

17. The electrophoretic display device of claim 1, further comprising:
a partition wall disposed between the plurality of pixel regions.

18. The electrophoretic display device of claim 17, wherein the partition wall comprises a light-blocking material.

19. An electrophoretic display device, comprising:
a plurality of electrode patterns disposed on a first base substrate;
a plurality of protrusions disposed on a second base substrate, wherein the second base substrate is positioned opposite to the first base substrate;
a common electrode disposed on the plurality of protrusions and the second substrate, wherein the common electrode comprises a plurality of openings formed between adjacent protrusions in a region corresponding to the plurality of electrode patterns, and the common electrode faces the plurality of electrode patterns; and an electrophoretic layer disposed between the first and second base substrates, and comprising a plurality of polarity particles dispersed in a non-polar solvent, wherein an area of each of the openings is about equal to or greater than an area of a corresponding electrode pattern.

20. The electrophoretic display device of claim 19, wherein a distance between each of the electrode patterns and the common electrode is about equal to or less than about 5 μM in a plan view.

21. The electrophoretic display device of claim 19, wherein a height of the protrusions is about equal to or less than about 2 μm.

22. The electrophoretic device of claim 19, wherein each of the electrode patterns corresponds to a different electric field region.

* * * * *